(12) United States Patent
Rozhin et al.

(10) Patent No.: US 8,832,235 B1
(45) Date of Patent: Sep. 9, 2014

(54) DEPLOYING AND RELEASING LOGICAL SERVERS

(75) Inventors: Mark Rozhin, San Jose, CA (US); Lyle Eric Wilkinson, Sunnyvale, CA (US); Mike Traynor, San Jose, CA (US); Yehia S Beyh, Groton, MA (US); Byron R Deadwiler, Union City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 352 days.

(21) Appl. No.: 12/406,060

(22) Filed: Mar. 17, 2009

Related U.S. Application Data

(63) Continuation-in-part of application No. 12/405,175, filed on Mar. 16, 2009.

(60) Provisional application No. 61/158,951, filed on Mar. 10, 2009.

(51) Int. Cl.
*G06F 15/16* (2006.01)
*G06F 15/173* (2006.01)
*H04L 12/24* (2006.01)

(52) U.S. Cl.
CPC ........ *H04L 41/0806* (2013.01); *H04L 41/0803* (2013.01)
USPC ........... 709/220; 709/221; 709/222; 709/223; 709/226

(58) Field of Classification Search
CPC ............ H04L 41/0233; H04L 41/0213; H04L 41/065; H04L 41/0803; H04L 41/0806; H04L 41/084; H04L 41/0846; H04L 41/085; H04L 41/0853

USPC ........................... 709/220–226, 248; 711/3, 4
See application file for complete search history.

(56) References Cited

U.S. PATENT DOCUMENTS

| | | | | |
|---|---|---|---|---|
| 6,760,761 | B1 * | 7/2004 | Sciacca | 709/220 |
| 6,839,747 | B1 | 1/2005 | Blumenau et al. | |
| 6,886,035 | B2 * | 4/2005 | Wolff | 709/219 |
| 7,051,342 | B2 * | 5/2006 | Christensen et al. | 719/330 |
| 7,178,059 | B2 * | 2/2007 | Greenspan et al. | 714/13 |
| 7,213,065 | B2 * | 5/2007 | Watt | 709/223 |
| 7,222,176 | B1 | 5/2007 | Laurent et al. | |
| 7,275,103 | B1 | 9/2007 | Thrasher et al. | |
| 7,321,926 | B1 | 1/2008 | Zhang et al. | |
| 7,356,679 | B1 * | 4/2008 | Le et al. | 713/1 |
| 7,448,034 | B2 * | 11/2008 | Anderson et al. | 717/176 |
| 7,577,661 | B2 * | 8/2009 | Bankston et al. | 1/1 |
| 7,577,722 | B1 * | 8/2009 | Khandekar et al. | 709/220 |
| 7,580,991 | B2 * | 8/2009 | Scheer et al. | 709/220 |

(Continued)

OTHER PUBLICATIONS

Simon Bisson, Nov. 24, 2008: "Managing virtual machines with System Center Virtual Machine manager and PowerShell", 3 pages.

(Continued)

*Primary Examiner* — Catherine Thiaw

(57) ABSTRACT

A deployed logical server is created by importing specifications, including a first network identity, of a first real server so that the logical server is stored in a logical-server database. The initially deployed logical server is released from the real server, and a second network identity is assigned to the first real server. The logical server is redeployed on a second real server so that it continues to be associated, in the logical-server database, with the first network identity and respective compute, storage, and network requirements.

11 Claims, 7 Drawing Sheets

(56) References Cited

U.S. PATENT DOCUMENTS

| | | | |
|---|---|---|---|
| 7,640,292 B1 | 12/2009 | Smoot | |
| 7,698,545 B1* | 4/2010 | Campbell et al. | 713/1 |
| 7,797,404 B1* | 9/2010 | Knight | 709/220 |
| 7,822,594 B2 | 10/2010 | Haviv et al. | |
| 7,831,702 B2* | 11/2010 | Johnson | 709/223 |
| 7,890,605 B1* | 2/2011 | Protassov et al. | 709/219 |
| 8,103,763 B2* | 1/2012 | Slepov et al. | 709/224 |
| 8,332,496 B2* | 12/2012 | Gopalakrishnan et al. | 709/222 |
| 8,370,470 B2* | 2/2013 | Kim et al. | 709/223 |
| 8,595,625 B2* | 11/2013 | Hung et al. | 715/735 |
| 2003/0051021 A1* | 3/2003 | Hirschfeld et al. | 709/223 |
| 2003/0069946 A1* | 4/2003 | Nair et al. | 709/220 |
| 2003/0074430 A1* | 4/2003 | Gieseke et al. | 709/221 |
| 2003/0084135 A1* | 5/2003 | Narain | 709/223 |
| 2003/0088658 A1* | 5/2003 | Davies et al. | 709/223 |
| 2003/0131078 A1* | 7/2003 | Scheer et al. | 709/220 |
| 2003/0149770 A1 | 8/2003 | Delaire et al. | |
| 2003/0177160 A1 | 9/2003 | Chiu et al. | |
| 2004/0008702 A1* | 1/2004 | Someya et al. | 370/401 |
| 2004/0039815 A1 | 2/2004 | Evans et al. | |
| 2004/0054866 A1 | 3/2004 | Blumenau et al. | |
| 2004/0210591 A1* | 10/2004 | Hirschfeld et al. | 707/100 |
| 2004/0243699 A1 | 12/2004 | Koclanes et al. | |
| 2005/0257003 A1 | 11/2005 | Miyazaki et al. | |
| 2005/0278584 A1 | 12/2005 | Asami et al. | |
| 2006/0004909 A1* | 1/2006 | Takuwa et al. | 709/203 |
| 2006/0010289 A1 | 1/2006 | Takeuchi et al. | |
| 2006/0031427 A1* | 2/2006 | Jain et al. | 709/220 |
| 2006/0047798 A1* | 3/2006 | Feinleib et al. | 709/223 |
| 2006/0080424 A1* | 4/2006 | Sun et al. | 709/223 |
| 2006/0095435 A1* | 5/2006 | Johnson et al. | 707/10 |
| 2007/0019626 A1* | 1/2007 | Lahiri et al. | 370/352 |
| 2007/0027973 A1* | 2/2007 | Stein et al. | 709/223 |
| 2007/0143767 A1 | 6/2007 | Attanasio et al. | |
| 2007/0168470 A1* | 7/2007 | Nonaka et al. | 709/219 |
| 2007/0192769 A1 | 8/2007 | Mimura et al. | |
| 2007/0233838 A1 | 10/2007 | Takamoto et al. | |
| 2007/0233848 A1 | 10/2007 | Nastacio | |
| 2007/0250608 A1 | 10/2007 | Watt | |
| 2007/0283009 A1* | 12/2007 | Takemura | 709/224 |
| 2008/0021984 A1* | 1/2008 | Zarenin et al. | 709/220 |
| 2008/0082656 A1* | 4/2008 | Reeves et al. | 709/224 |
| 2008/0109542 A1* | 5/2008 | Ferri et al. | 709/222 |
| 2008/0123559 A1* | 5/2008 | Haviv et al. | 370/255 |
| 2008/0189468 A1* | 8/2008 | Schmidt et al. | 711/6 |
| 2008/0201458 A1* | 8/2008 | Salli | 709/223 |
| 2008/0216006 A1 | 9/2008 | Jordan et al. | |
| 2008/0244199 A1* | 10/2008 | Nakamura et al. | 711/156 |
| 2008/0270674 A1 | 10/2008 | Ginzton | |
| 2008/0295064 A1 | 11/2008 | Mitra et al. | |
| 2009/0006954 A1 | 1/2009 | Jackson et al. | |
| 2009/0055507 A1* | 2/2009 | Oeda | 709/216 |
| 2009/0063767 A1* | 3/2009 | Graves et al. | 711/114 |
| 2009/0083400 A1* | 3/2009 | Draca et al. | 709/220 |
| 2009/0113124 A1 | 4/2009 | Kataoka et al. | |
| 2009/0132683 A1 | 5/2009 | Furuyama et al. | |
| 2009/0138541 A1* | 5/2009 | Wing et al. | 709/201 |
| 2009/0157998 A1 | 6/2009 | Batterywala | |
| 2009/0171821 A1 | 7/2009 | Denker et al. | |
| 2009/0198817 A1 | 8/2009 | Sundaram et al. | |
| 2009/0199175 A1 | 8/2009 | Keller et al. | |
| 2009/0210527 A1 | 8/2009 | Kawato | |
| 2009/0216867 A1* | 8/2009 | Pusateri et al. | 709/222 |
| 2009/0240790 A1 | 9/2009 | Utsunomiya et al. | |
| 2009/0276772 A1* | 11/2009 | Garrett et al. | 718/1 |
| 2009/0282135 A1* | 11/2009 | Ravindran et al. | 709/222 |
| 2009/0287799 A1 | 11/2009 | Tamesshige et al. | |
| 2010/0058349 A1 | 3/2010 | Diwakar et al. | |
| 2010/0100878 A1* | 4/2010 | Otani | 718/1 |
| 2010/0125712 A1 | 5/2010 | Murase et al. | |
| 2010/0169467 A1* | 7/2010 | Shukla et al. | 709/220 |
| 2010/0223610 A1* | 9/2010 | Dehaan et al. | 717/178 |
| 2011/0004676 A1* | 1/2011 | Kawato | 709/221 |

OTHER PUBLICATIONS

TechLog—WSV part of Windows Server 2008 SP1, Author: TechLog, Maarten Goet, Published: Jun. 7, 2007. http://www.techlog.org/archive/2007/06/07/wsv_viridian_part_oCwindows_.

* cited by examiner

DEPLOYING AND RELEASING LOGICAL SERVERS

This application is a continuation in part of co-pending U.S. patent application Ser. No. 12/405,175 filed 2009 Mar. 16 and claims the benefit of the 2009 Mar. 10 filing date of provisional application 61/158,951.

BACKGROUND

Herein, related art is described to facilitate understanding of the invention. Related art labeled "prior art" is admitted prior art; related art not labeled "prior art" is not admitted prior art.

A data center administrator may try to release computing resources for other uses by stopping a workload that was consuming those resources but is not presently needed. Upon stopping a server, the administrator may lose track of the compute, storage, and network requirements of the workload. When it is necessary to bring the application back on line, reactivation may be complicated because the original compute resources may not be available, and the workload's requirements for compute, storage, and networks resources may have been forgotten. Despite the fact that a server can be stopped, resources, e.g. memory, are still committed. Further, restarting a server entails starting back on the original host rather than giving the flexibility to have it started elsewhere for load balancing.

DETAILED DESCRIPTION

Figure 1:
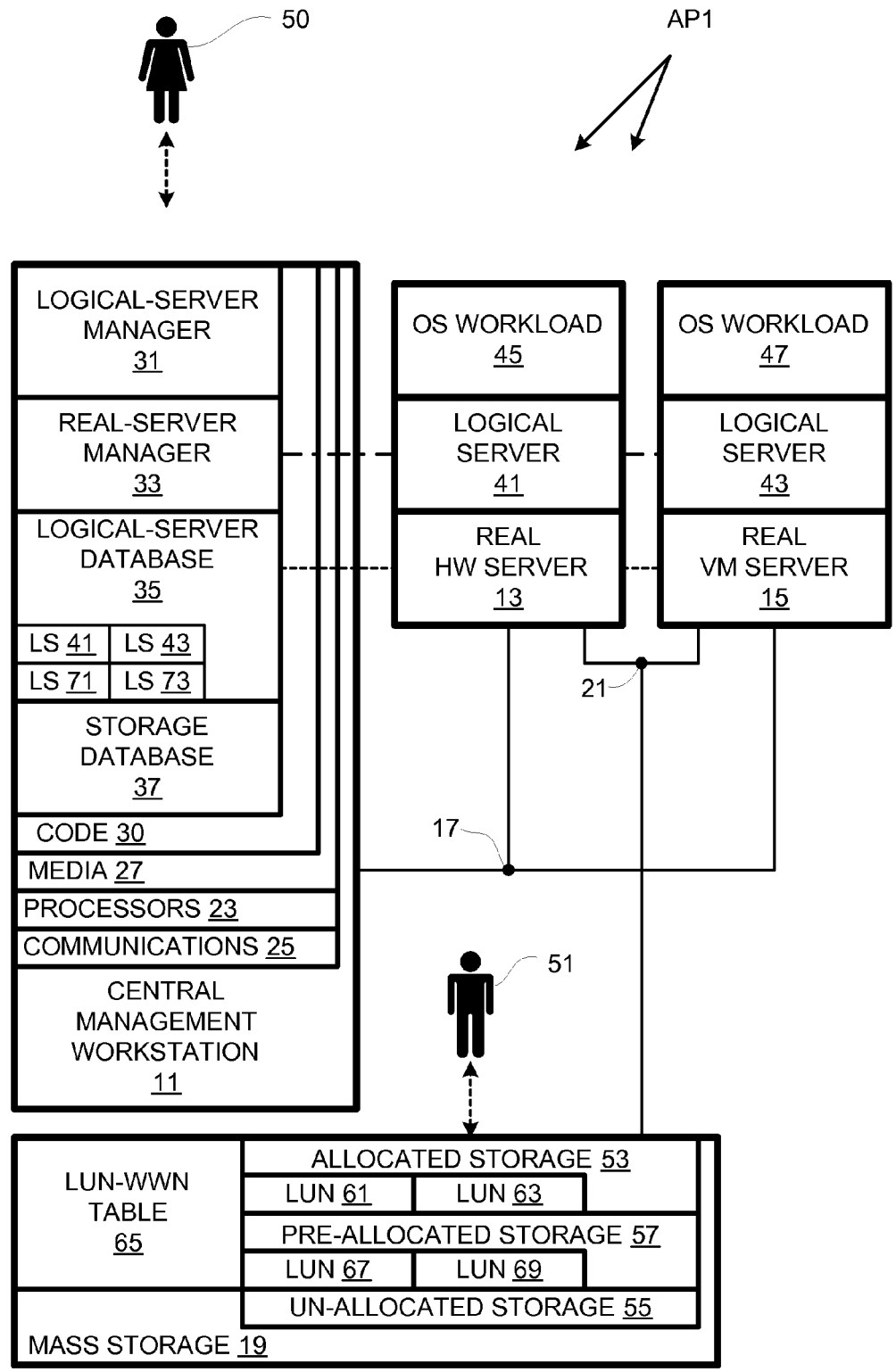
FIG. 1 is a schematic diagram of a data center employing logical servers in accordance with an embodiment of the invention.

The present invention provides for deploying a logical server to a real (hardware or virtual-machine) server, releasing (un-deploying) the logical server from the real server, and redeployment of the logical server to the same or a different real server. Redeployment can occur immediately or after a period of dormancy. During deployment, redeployment, and any intervening period of dormancy, the logical server persists as a data structure in a logical server database. A logical server can be "terminated" by deleting its data from the database. During deployment, a logical server functions as a management proxy for a real server. During dormancy, a logical server can function to preserve network identities and resource requirements for a workload.

When a logical server is deployed, the network identities of the logical server and the host real server are conformed. Generally, when a logical server is released, it retains the common network identities; in this case, the real server reverts to old network identities or assumes new network identities. As a result of relinquishing network identities, a real server loses access to mass storage where workload programs and data may be stored. As a result, the real server no longer has access to a workload "contained" by a logical server, and the workload no longer consumes any resources associated with the real server. The real server resources are freed for use by a new workload (e.g., by hosting a new logical server), and the logical server and associated workload are free for redeployment to the same or a different real server.

A deployed logical server can also be "deactivated", which has the effect of shutting down the real server on which it is deployed and halting operation of the contained workload. "Reactivating" the logical server provides for resuming operation of the underlying real server and the contained workload on that real server. Deactivating a logical server deployed to a real server has an effect analogous to that resulting from deactivating a virtual-machine on a hardware computer—some resources of the underlying host remain committed to a halted workload.

Releasing a logical server rather than deactivating it, more effectively frees both the real server and the logical server for new deployments, e.g., to achieve load balancing. In addition, a dormant logical server preserves the information needed to access its workload upon redeployment, relieving a system administrator of the burden of manually tracking relations between workloads and hosts.

A "computer" is a machine including 1) computer-readable storage media in which data and instructions for manipulating the data are or can be encoded, and 2) one or more processors for manipulating tangible analogs of data in the course of executing tangibly encoded instructions. The functionality of a computer is defined in part by programs of instructions; these programs typically include 1) an application program that defines, at least in part, a mission of the computer, and 2) an operating system that serves as an interface between the application program and the computer. Hereinafter, the terms "program", "instructions", "code", and "data" refer to their physical analogs as encoded in computer-readable storage media unless otherwise indicated.

A "virtual machine" is a program of instructions that serves as an interface between an operating system and a computer. From the perspective of an operating system, a virtual machine is the functional equivalent or near equivalent of a computer. A "hypervisor" is a program of instructions that serves as an interface between one or more virtual machines and a computer.

A "network" is a set of interconnected network nodes and the interconnections over which the nodes communicate with each other. The nodes can include computers, peripherals (e.g., printers, modems), and storage devices. A computer that provides services to other computers (most networked computers qualify) is referred to as a "server".

From the perspective of remote network nodes, some virtual machines are functionally equivalent to computers and thus can be considered "servers". Herein, the phrases "hardware server" or "HW server" and "virtual-machine server" or "VM server" are used to distinguish a computer functioning as a server from a virtual machine functioning as a server. Herein, both HW servers and VM servers are considered "real servers" because they both have a substantial tangible presence (in the form of hardware or encoded media) at a network node and perform real services to other nodes on a network.

Herein, a "logical server" is a network management object. Typically, the code defining a logical server deployed on a real server resides primarily with system management servers rather than on the real server. Each logical server has assigned to it 1) one or more network identities, and 2) resource requirements. Other data, e.g., historical data, can also be assigned to a logical server. Such workload-related data can persist in a logical-server database, even when the logical server is dormant (not deployed), thus permitting workload migration by redeployment of a logical server. A logical server can be "deployed" or "undeployed". When deployed, logical servers are assigned to real servers, typically on a one-to-one basis. During deployment, a logical server functions as a management proxy for the real server.

In general, the real server to which a deployed logical server is assigned "adopts" the network identity or identities of the logical server. VM servers conventionally have assignable network identities (e.g., MACs and WWNs); thus, when a logical server is assigned to a VM server, the VM server adopts the logical server's network identities as its own. HW servers typically have hardwired network identities; therefore, some enabling technology is required for an HW server to adopt the network identities of a logical server assigned to it. A virtual-connection technology (such as Virtual-Connect, available with blade systems from Hewlett-Packard Company) is such an enabling technology.

A data center AP1 includes a central management workstation 11 and managed devices including a real hardware (HW) server 13 and a real virtual-machine (VM) server 15, as shown in FIG. 1. Servers 13 and 15 are connected with central management workstation 11 by an Internet Protocol (IP) network 17. Servers 13 and 15 are also connected to mass storage 19 via a storage-array network (SAN) 21.

Central management server 11 includes processors 23, communications devices 25, and computer-readable storage media 27. Media 27 is encoded with code 30 for computer-executable program instructions and data, including a logical-server manager 31, a real-server manager 33, a logical-server database 35, and a storage database 37.

Logical-server manager 31 defines and provides for management abstraction layer populated with logical servers including logical servers 41 and 43. The logical servers are characterized by data in logical-server database 35 and can persist even when not deployed to a real server. Logical server 41 is a management object deployed on real HW server 13, while logical server 43 is deployed to real VM server 15. From a management perspective, an operating system workload 45 running on HW server 13 runs on logical server 41, while another operating system workload 47 runs on VM server 15.

A system administrator 50 manages data center AP1 by interacting with logical-server manager 31. Logical-server manager 31, in turn, translates technology-independent inputs by system administrator 50 into technology-dependent instructions to real-server manager 33. Real-server manager 33 then implements the instructions by communicating with real servers 13 and 15 and other nodes over IP network 17.

Mass storage 19 is managed separately from IP network 17 by a storage administrator 51. Mass storage 19 includes arrays of hard disks, some of which provide allocated storage 53, some constitute un-allocated storage 55, and others provide for pre-allocated storage 57. Allocated storage 53 is divided into logical units 61 and 63, each of which is assigned to a host WWN in a logical-unit table 65. The WWN for logical unit 61 belongs to server 13, which thus has exclusive access to logical unit 61. The WWN for server 15 is assigned to LUN 63, so server 15 has exclusive access to LUN 63. LUNs are not defined for un-allocated storage 55.

Pre-allocated storage 57 includes LUNs 67 and 69. These are associated with WWNs in table 65 that belong to undeployed logical servers 71 and 73. Logical server 71 is a logical server that has been created but has not been deployed. Logical server 73 was previously deployed but then decommissioned. Note that characterizing information (e.g., capacity, RAID level) for each LUN is represented on central-management workstation 11 in storage database 37.

Figure 2:
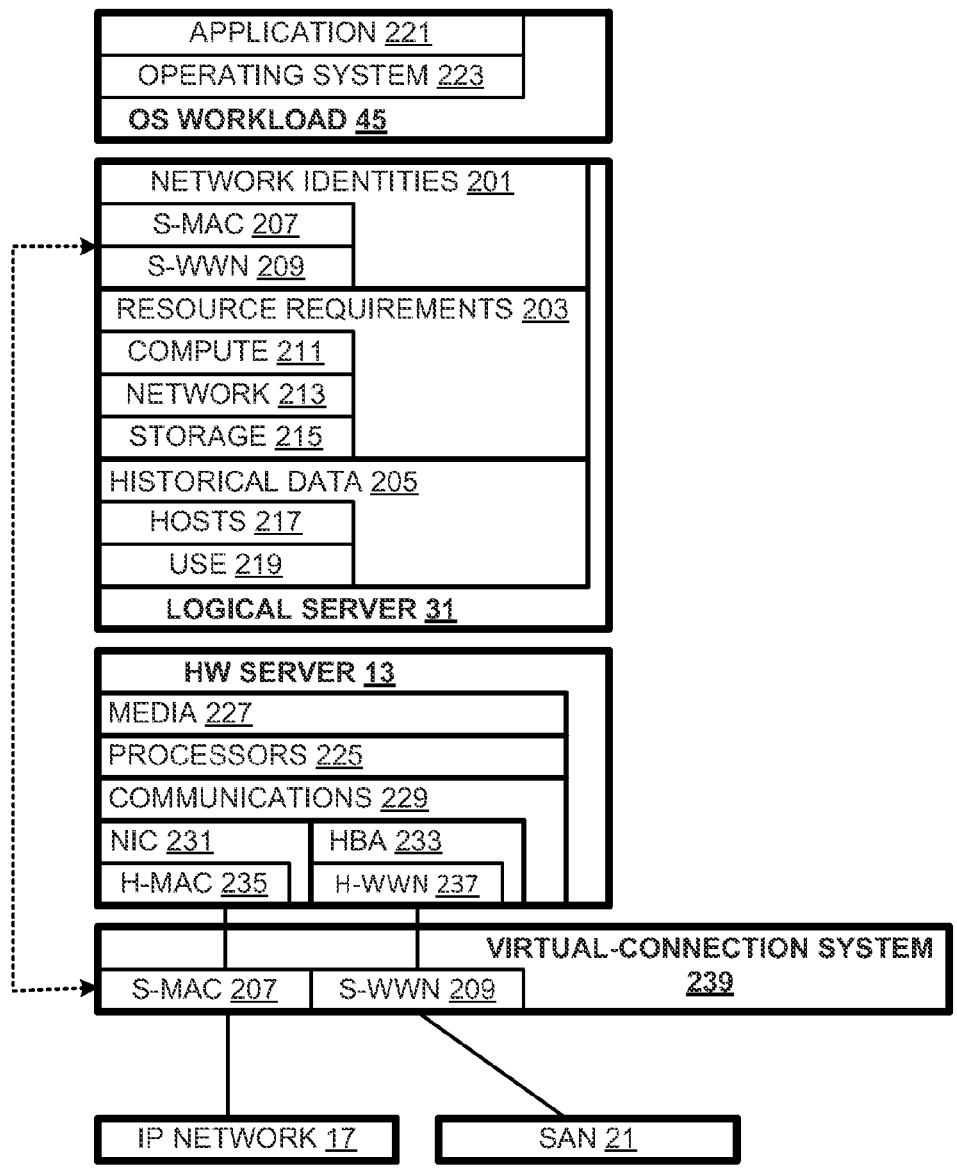
FIG. 2 is a schematic diagram of a portion of the data center of FIG. 1 relating to a logical server assigned to a hardware server.

As shown in FIG. 2, the information in logical-server database 35 for logical server 31 includes network identities 201, resource requirements 203, and historical data 205. Network identities 201 include a soft media-access-control (S-MAC) address 207 and a soft world-wide name (S-WWN) 209. Requirements 203 include compute requirements 211 (such as a number and type of processors, main memory capacity), network requirements 213 (e.g., bandwidth and redundancy), and storage requirements 215 (e.g., capacity and RAID level).

Historical data 205 can include host data 217, e.g., a list of real servers on which logical server 41 has been deployed, and utilization data 219. Utilization data can be gathered with respect to such parameters as CPU cycles, memory, disk I/O, network 110, and power. Utilization data can include average utilization per host as well as utilization-vs-time profiles. Other embodiments take into account inclusion and exclusion rules that dictate when multiple logical servers cannot or must reside next to one another in a visualized environment provided by logical-server manager 31. The utilization data can be used in finding workloads with utilizations that vary over time in a complementary fashion to make more efficient use of available resources. Historical host data 217 can be used in selecting target hosts that are the same or similar to other hosts on which any compatibility issues were successfully addressed.

From a management perspective, logical server 41 acts as a container for workload 45. However, unlike a virtual machine, which can also act as a container for a workload, logical server 41 does not intercept and translate communications between the workload and the underlying real server. In the case of workload 45, which includes an applicator 221 running on an operating system 223, operating system 223 communicates directly with HW server 13 substantially as it would in the absence of logical server 41.

Generally, deployment of a logical server on a real server is an indication that the requirements of the logical server are met by the real server. In addition, the real server adopts the network identities of the logical server. For example, HW server 13 includes processors 225, media 227, and communications devices 229. Communications devices 229 include a network interface card (NIC) 231 for interfacing with IP network 17 and a host-bus adapter (HBA) 233 for interfacing with SAN 21. NIC 231 has a hardwired MAC (H-MAC) address 235; HBA 233 has a hardwired WIN (H-WWN) 237. Since MAC 235 and WWN 237 are hardwired, they cannot be changed to match the corresponding network identities of logical server 41.

In some embodiments of the invention, NICs and HBAs are used that support soft proxy MACs (S-MACs) and soft proxy WWNs (S-WWNs). A HW server with such a NIC and such an HBA can be configured to adopt the network identities of a logical server. The illustrated embodiment uses a different solution. HW server 13 is a blade in a blade system providing for virtual connection technology. A virtual connection system 239 can assume network identities 207 and 209 and provide the necessary translation to H-MAC 235 and H-WWN 237.

Figure 3:
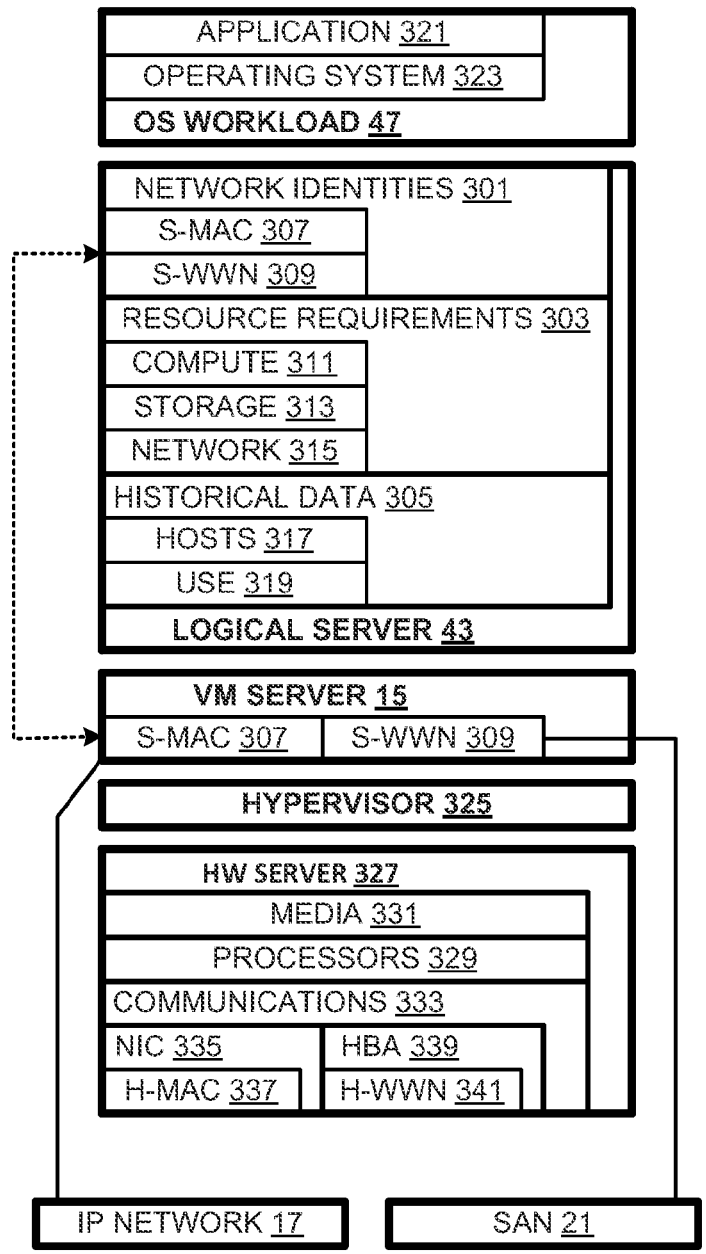
FIG. 3 is a schematic diagram of a portion of the data center of FIG. 1 relating to a logical server assigned to a virtual-machine server.

No such translation is required for a logical server deployed on a virtual-machine server, as virtual-machine servers conventionally have soft network identities. As shown in FIG. 3, logical server 43 includes network identities 301, resource requirements 303, and historical data 305. Network identities 301 include an S-MAC 307 and an S-WWN 309. Resource requirements 303 include compute requirements 311, storage requirements 313, and network requirements 315. Historical data 305 includes historical host data 317 and utilization statistics and profiles 319. When logical server 43 is deployed, VM server assumes S-MAC 307 and S-WWN 309. Thus, devices communicating with VM server 15 act as though they are communicating with logical server 43.

In FIG. 3, logical server 43 is shown in a layer between VM server 15 and OS workload 47, which includes an application 321 and an operating system 323. In reality, operating system 323 communicates directly with VM server 15 without intervention by logical server 43. VM server 15 communicates through a hypervisor 325 with a hardware server 327. Hardware server 327 includes processors 329, media 331, and communications devices 333. Communications devices 333 include an NIC 335 with an H-MAC 337 and an HBA 339 with an H-WWN 341. Virtual connection system 239 (FIG. 2) can be used with HW server 327 so that a logical server 71 (FIG. 1) can be deployed there.

Logical-server manager 31 provides for a method ME1 variously represented in FIGS. 4-7 to emphasize its different aspects. As flow charted in FIG. 4, method ME1 provides alternative approaches to creating a logical server. Method segment 401 involves creating an undeployed logical server. This can be accomplished by specifying values for each required parameter for a logical server, e.g., network identities and resource requirements. Alternatively, an existing logical server can be duplicated and edited (e.g., the network identities changed) to create a new logical server.

Method segment 403, on the other hand, creates a deployed logical server from a real server by importing specifications of the real server. The result can be a logical server with the real server's network identities and with resource requirements that match the specifications of the real server. Method segment 403 is particularly useful when converting a pre-existing server for use as logical server technology is implemented on an existing data center. A variation of method segment 403 can provide for an import-copy operation in which the specifications of a real server are used to generate an undeployed logical server.

Method segment 405 provides for deployment of an undeployed logical server, such as one resulting from method segment 401. Alternatively, the undeployed logical server can be a formerly deployed logical server that has been released from its former host. As part of the deployment process, the target real server adopts (e.g., using virtual-connection technology) the network identities of the logical server.

Whether deployment is a result of importation at method segment 403 or deployment of a pre-existing logical server at method segment 405, deployment involves effectively conforming network identities. In the case of importation, the logical server adopts upon creation the pre-deployment network identity or identities of the real server. In the case of deployment of a pre-existing logical server with one or more pre-existing network identities, the real server effectively adopts at least one of the pre-existing network identities of the logical server. "Effectively adopts" encompasses "adopts" and "adoption by proxy". The latter involves a soft proxy network identity for a hardwired network identity, as provided for by virtual-connection technology or NICs and HBAs that support soft MACs and WWNs, respectively.

Method segment 407 involves operating a logical server. This in turn can involve installing an operating system, installing an application, and running the application. Method segment 409 involves tracking hosts and operational data, including utilization (statistical and time-profile) data. Tracking the host, in this case, simply means associating the identity and specification of the host real server with the deployed logical server in logical-server database 35 (FIG. 1).

During the course of operation of data center AP1 (FIG. 1), a logical server may be released (un-deployed) from its host real server at method segment 411. Release is distinct from de-activation, which involves stopping a workload but maintaining the deployment of the logical server so that the workload can be reactivated on the same real server. In a release, the host real server typically relinquishes the network identities of the logical server so that the logical server can be re-deployed elsewhere.

Note that if the logical server was "imported" from the real server and so assumed network identities formerly associated with the real server, the real server can effectively assume new network identities when the logical server is released; this permits the logical server to maintain the merged network identities and continue to contain the workload stored in mass storage and network locations associated with those network identities.

Method segment 413 involves storing an un-deployed logical server. This storing is inherent, as logical servers are stored in logical-server database 35 (FIG. 1) whether they are deployed or not. The persistence of undeployed logical servers means that they are available to be redeployed on the same or different real server at a later time.

Method segment 413 involves evaluating potential real server targets as hosts for a selected logical server. Evaluation can be required for a logical server that has not been deployed or where the availability of a previous host has been compromised (e.g., another logical server has been deployed on it). Once potential real-server hosts have been evaluated, one can be selected for deployment at method segment 417.

At method segment 419, the logical server released at method segment 411 can be redeployed on the real server selected at method segment 417. This real server may be the original host or a different host. In the latter case, the different host can be one of the same or a different technology than the original host. For example, the original host can be a VM server and the new host can be a HW server. Where such a technology change is involved, logical-server manager 31 instructs real-server manager 33 regarding the measures required to affect the transfer.

Figure 5:
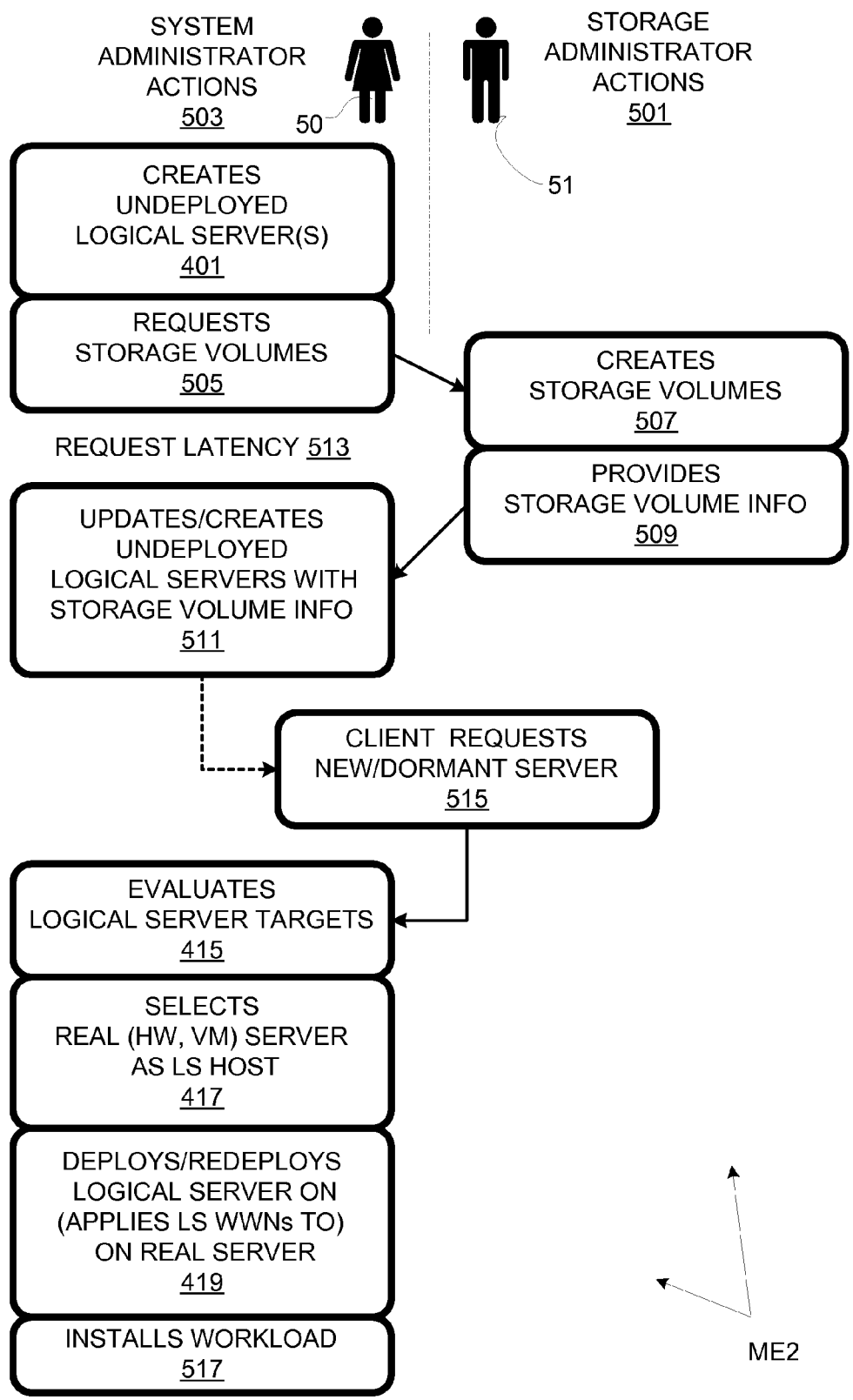
FIG. 5 is an alternative flow chart of the method of FIG. 4 emphasizing mass storage deployment.

The flow chart of FIG. 5 differentiates the actions 501 of storage administrator 51 from the actions 503 of system administrator 50 in the course of method ME1. As above, system administrator 50 creates one or more undeployed logical servers at method segment 401. At method segment 505, system administrator 50 requests that storage administrator 51 create storage volumes for the world-wide names and storage requirements associated with the logical servers. The request can specify capacity, RAID (redundant array of inexpensive disks) level, WWNs from logical server definitions, operating system type, etc.

At method segment 507, storage administrator 51 creates the requested logical storage volumes. This can involve selecting a storage array, creating storage volumes, mapping to array controller ports, setting masks for HBA WWN, setting host modes, and zoning. At method segment 509, storage administrator 51 provides storage volume information on WWN, array, LUN, etc., to system administrator 50.

At method segment 511, system administrator 50 stores the provided information in storage database 37 and updates undeployed logical servers with LUN details (array, controller port, WWN, LUN) information required for accessing the assigned storage volumes. In an alternative embodiment, a system administrator requests a pool of storage volumes meeting certain specifications; once the storage volumes are provided, the system administrator creates (at method segment 511) logical servers to access the storage volumes.

Between the request at method segment 505 and the communication of storage volume information at method segment 509, there is a request latency 513. In practice, this latency can be days or weeks long. In event, the latency may be out of control of the system administrator. However, since the request can be made long before a client requests a new server, the latter's request can be met promptly.

At method segment 515, a client requests a new server. At this point, system administrator 50 can respond without having to rely further on storage administrator 51. In fact, system administrator is in the same position that would result from a request at 515 for redeployment of a formerly released logical server. In response, system administrator evaluates logical server targets at method segment 415, selects a target at method segment 417, and deploys the logical server on the selected target at method segment 419. At method segment 517, system administrator 50 installs a workload, either just the operating system or an operating system and an application. In the former case, the client may install the application.

Figure 6:
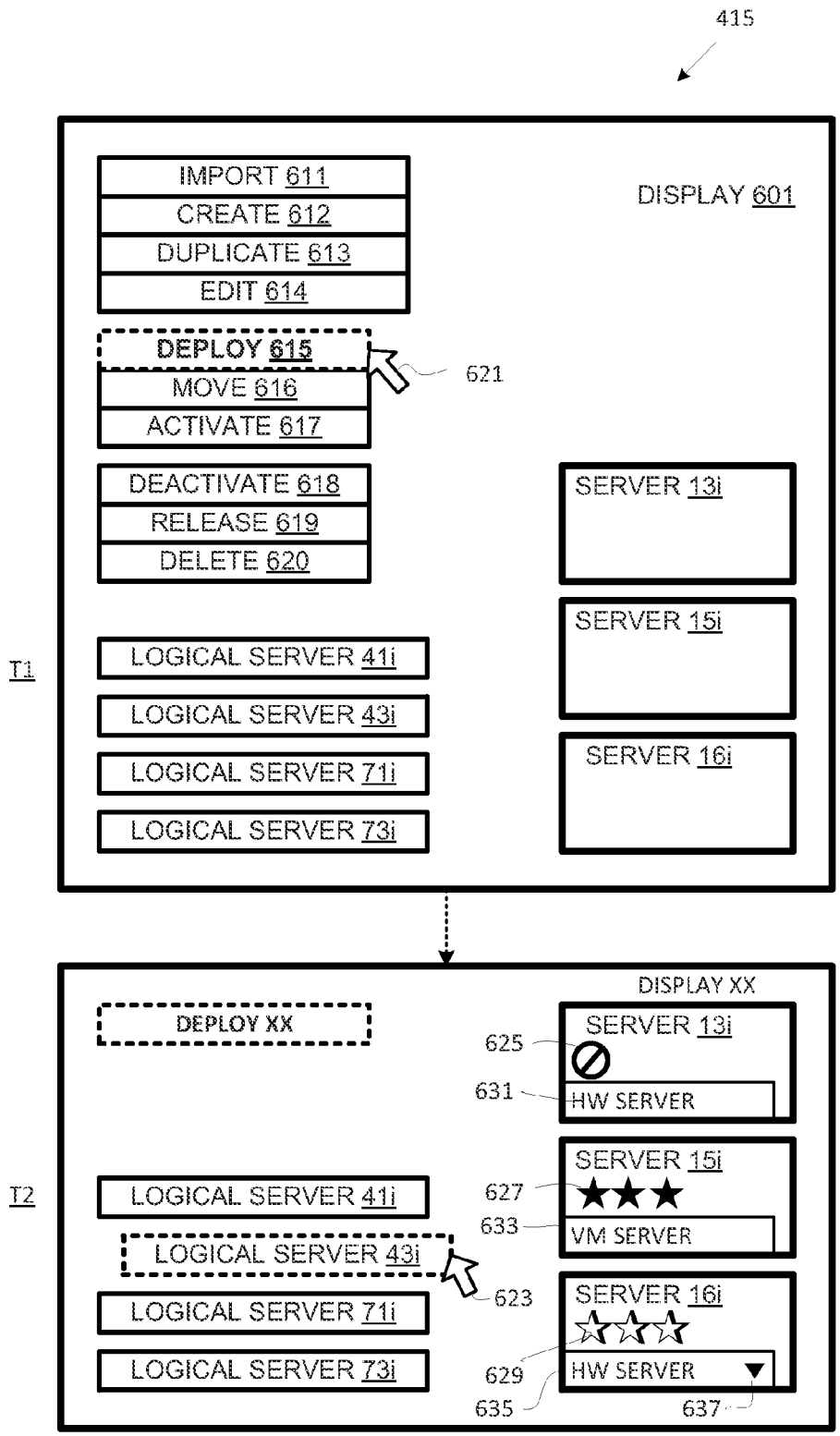
FIG. 6 is a sequence diagram for an evaluation method segment of the method of FIG. 4.

Evaluation method segment 415 is further detailed with reference to FIGS. 6 and 7. A display 601 of central management workstation 11 (FIG. 1) is shown at time T1 showing a list 603 of logical-server operations 611-620, graphic representations 41*i*, 43*i*, 71*i* and 73*i* of logical servers 41, 43, 71, and 73, respectively, and graphic representations 13*i*, 15*i*, 16*i* respectively of real servers 13 and 15 (FIG. 1) and a recently added hardware server.

Figure 4:
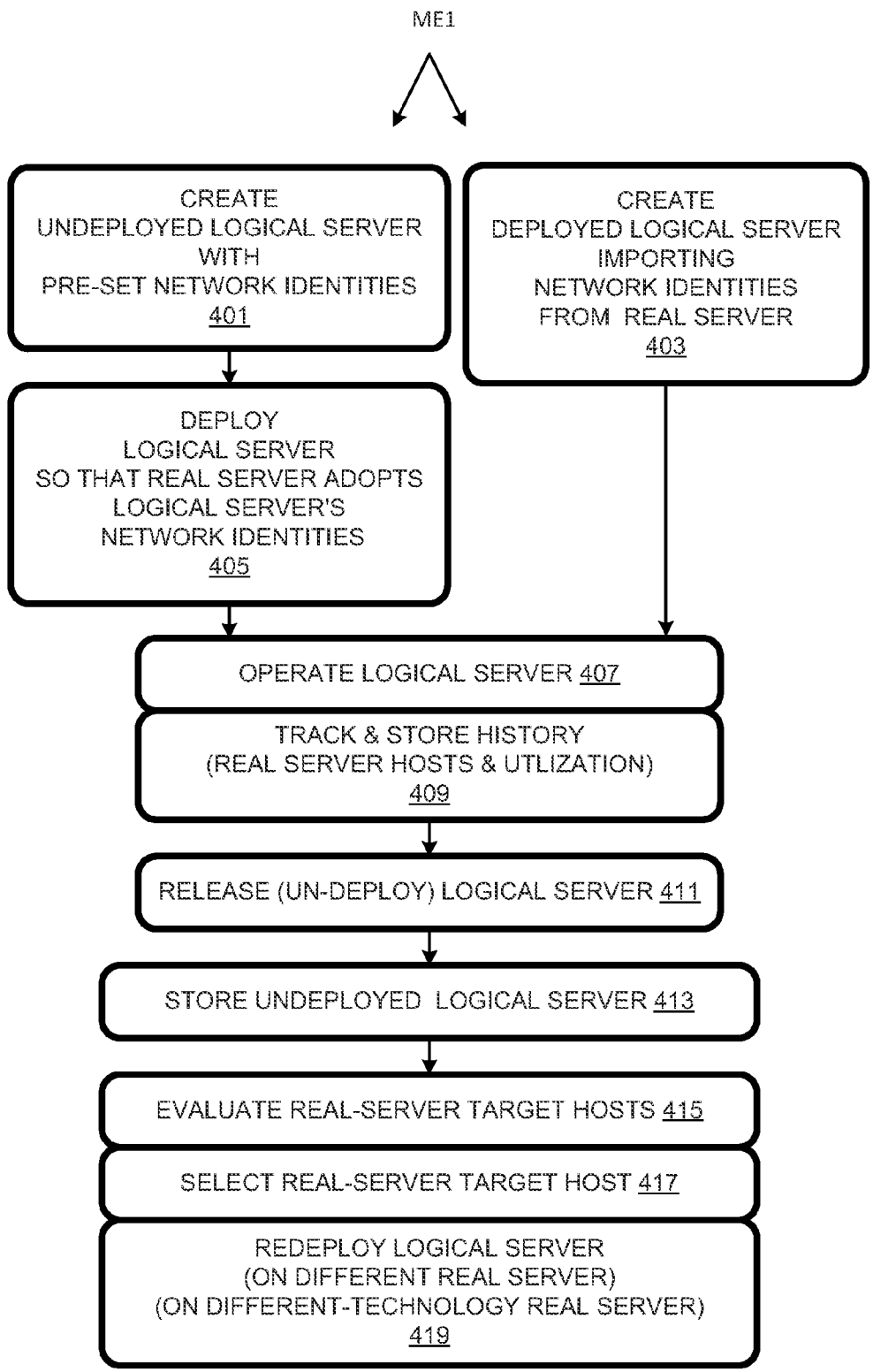
FIG. 4 is a flow chart of a method implemented in part by a logical-server manager of the data center of FIG. 1.

Import 611 relates to method segment 403 of FIG. 4. Create 612 relates to method segment 401 of FIG. 4. Duplicate 613 and edit 614 also relate to method segment 401, where a new logical server is created by duplicating an existing logical server and then editing at least the network identities. Deploy 615 relates to method segment 405, e.g., assigning a logical server to a real server. Move 616 involves an atomic combination of a release from one real server and transfer to another real server. Activate 617 involves activating a workload on a deployed logical server, while deactivating 618 involves stopping a workload on a deployed logical server. Release 619 relates to method segment 411 and involves un-deploying a deployed logical server, freeing up the host real server. Delete 620 involves removing a logical server's identity and data from logical server database 35 so that the logical server no longer exists. As indicated by cursor 621, system administrator 50 has selected deploy operation 615 at time T1.

During the deploy operation, system administrator 50 selects and begins to drag graphic representation 43*i* for logical server 43, as indicated by cursor 623. In response, ratings indications appear in each target representation 13*i*, 15*i*, and 16*i*. A "do not enter" symbol 625 indicates that server 13 is not a suitable target host for logical server 43. For example, hardware server's compute resources may not meet the specification for logical server 43; alternatively, another logical server may be deployed on server 13, leaving insufficient spare capacity for logical server 43.

To the contrary, the three dark stars 627 in representation 15*i* represent the highest possible rating of server 15 for deployment of logical server 43. This might be expected since server 15 previously hosted logical server 43. In the illustrated embodiment, one star indicates that the minimum resource requirements for a selected logical server are met, 2 stars indicates that recommended requirements are met, and 3 stars indicates that the recommended requirements are substantially exceeded (leaving ample headroom for peak usage times). These determinations can take into account utilization collected at method segment 409 (FIG. 4). In an alternative embodiment, a five-star rating system is used to provide finer differentiation in evaluating targets. In other embodiments, more or less fine ratings are used and different colors and symbols are used to represent the ratings.

Even a maximally rated target may not be an appropriate selection. For example, administrator 50 may know that target 15 is scheduled for downtime due to maintenance and another target is needed. Target 16*i* represents a newly commissioned hardware server. It has a maximal rating indicated by 3-star rating 629, but the stars of rating 629 are dark instead of white, indicating deployment involves a change of technology. Host history data collected at method segment 409 (FIG. 4) for logical server 43 indicates that logical server 43 was successfully deployed on a VM server, but has not been validated on a HW server.

In most cases, logical-server manager 31 takes care of cross-technology compatibility issues. However, the chances of compatibility issues still remain slightly higher when a cross-technology transfer is involved. Since administrator 50 may be concerned about compatibility issues, a further search for a suitable target may be in order.

Note that, at time T2, in response a default technology is indicated for each target. For server 13, the default technology is expressed as "HW server" 631*y*. For server 15, the default technology is "VM server" 633. For the new server, the default technology is "HW server" 635. Note that this last indication includes a drop-down menu arrow 637.

Figure 7:
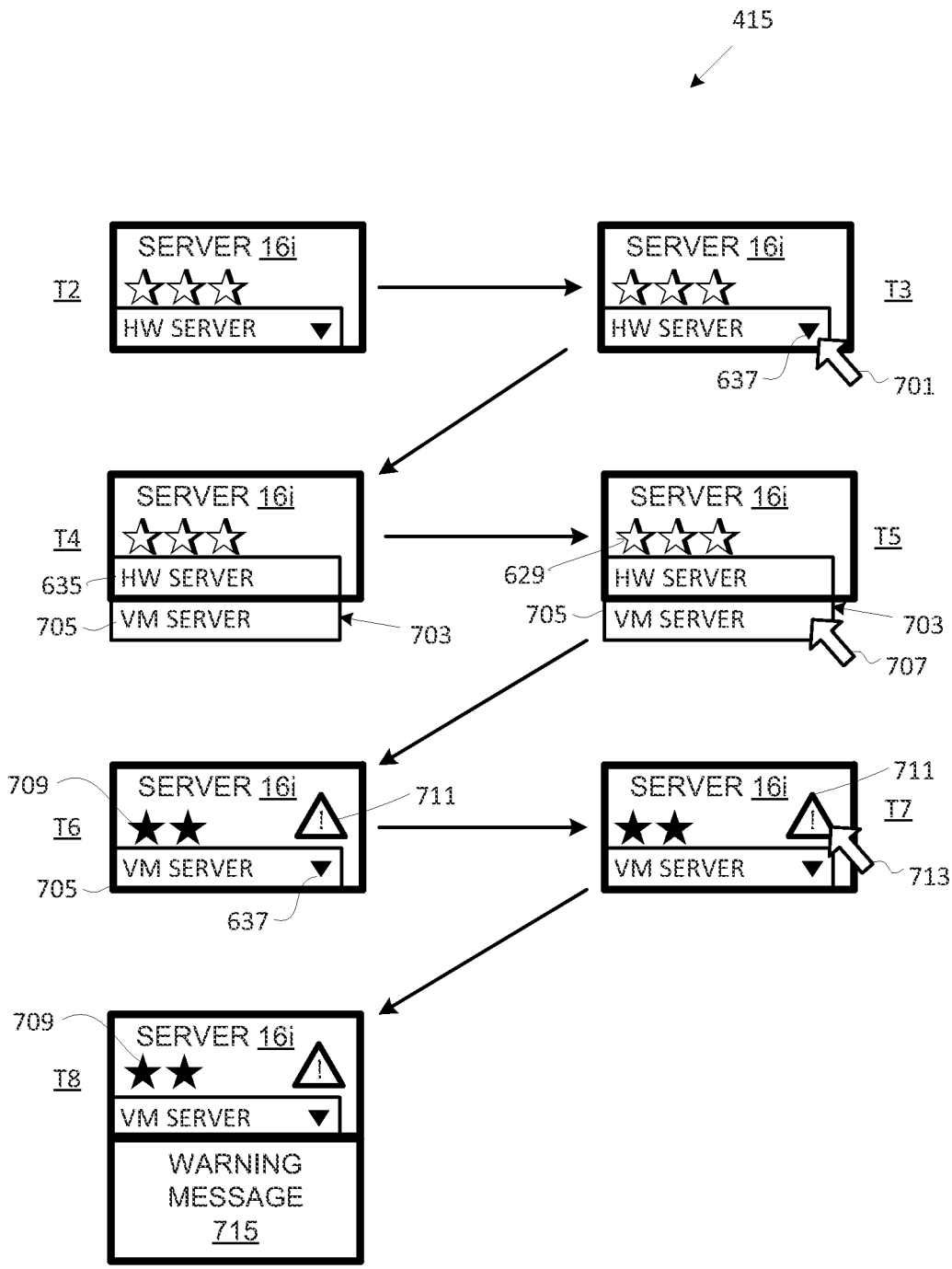
FIG. 7 is a sequence diagram continuing from FIG. 6.

System administrator 50 can click on arrow 637 using cursor 701 as shown at time T3 in FIG. 7. The result is that default technology indication 635 expands to reveal, at time T4, a drop-down menu 703 including default technology indication 635 and an alternative technology indication "VM server" 705.

At time T5, system administrator 50 clicks on alternative technology indication 705 as indicated by cursor 707. In response, by time T6, drop-down menu 703 (see time T4) has collapsed (as indicated by arrow 637) and only alternative technology indication 705 is shown. The three white star rating 629 has been replaced by a two dark star rating 709, and a warning indicator 711 has appeared.

System administrator 50 hovers over warning indication 711 (or anywhere over representation 16*i*) as indicated by cursor 713 at time T7. In response, at time T8, a warning message 715 appears. For example, warning message 715 may read "A hypervisor must be installed before the selected logical server can be deployed using the selected technology." Other warning messages may occur for other reasons. Note that a similar type of message can appear when an administrator hovers over a "do not enter" indication such as 625 in FIG. 6.

The need for a hypervisor to be installed, as indicated by message 715 at time T8 indicates why the three white stars 629 changed to two dark stars 709 when the real-server technology changed from hardware to virtual machine. Due to overhead, associated with a hypervisor, lower performance can be expected than if the logical server were assigned to a "bare metal" hardware server. System administrator 50 can now choose between better performance or a lower risk of incompatibility.

Where a logical server imports hardwired network identities, it may not be able to retain these upon release. In such a case, the invention provides for assigning new network identities to the logical server and reassociating the logical units associated with the old network identities to the new network identities. These and other variations upon and modifications to the illustrated embodiment are provided by the present invention, the scope of which is defined by the following claims.

What is claimed is:

1. A method comprising:

creating a deployed logical server by importing specifications of a first real server so that said logical server is stored in a logical-server database, said specifications including a first network identity of said first real server, said logical-server database storing plural logical servers, said database associating each of said logical servers with a respective network identity and compute, storage and network requirements, said logical servers having alternative deployed and undeployed states, said logical servers, when deployed, serving as management abstractions for workload containers in the forms of real physical servers and real virtual servers;

releasing said logical server from said first real server so that said logical server is undeployed;

assigning a second network identity to said first real server; and redeploying said logical server to a second real server so that said logical server continues to be associated, in said logical-server database, with said first network identity and respective compute, storage, and network requirements.

2. A method as recited in claim 1 wherein said first network identity is a World Wide Name (WWN) or a Media Access Control (MAC) address.

3. A method as recited in claim 1 wherein said first and second real servers are different but both meet the compute, storage, and network requirements for said logical server.

4. A method as recited in claim 3 wherein one of said first and second real servers is a hardware server and the other is a virtual-machine server.

5. A method as recited in claim 1 wherein, while said logical server is deployed to said second real server, said second real server effectively adopts a network identity formerly associated with said first real server.

6. A method as recited in claim 1 wherein, between said releasing and said redeploying, storing said logical server in a dormant state.

7. A system comprising non-transitory computer-readable storage media encoded with code to, when executed by a processor:

create a deployed logical server by importing specifications from a first real server so that said logical server is stored in a logical-server database storing plural logical servers, said specifications including a first network identity of said first real server, said database associating each of said logical servers with a network identity and compute, storage and network requirements, said logical servers having alternative deployed and undeployed states, said logical servers, when deployed, serving as management abstractions for workload containers in the forms of real physical servers and real virtual servers;

release said logical server from said first real server so that said logical server is undeployed;

assign a second network identity to said first real server; and redeploy said logical server to a second real server so that said logical server continues to be associated, in said logical-server database, with said first network identity and respective compute, storage, and network requirements.

8. A system as recited in claim 7 wherein said code first network identity is a World Wide Name (WWN) or a Media Access Control (MAC) address.

9. A system as recited in claim 7 wherein said code is further to store said logical server in a dormant state in said database in association with its network identity and its compute, storage, and network requirements.

10. A system as recited in claim 7 further comprising said processor.

11. A system as recited in claim 7 wherein one of said first and second real servers is a hardware server and the other is a virtual-machine server.

* * * * *